(12) United States Patent
Agrawal et al.

(10) Patent No.: US 10,931,591 B2
(45) Date of Patent: Feb. 23, 2021

(54) ALLOCATION OF VIRTUAL QUEUES OF A NETWORK FORWARDING ELEMENT

(71) Applicant: Barefoot Networks, Inc., Santa Clara, CA (US)

(72) Inventors: Anurag Agrawal, Santa Clara, CA (US); Michael Feng, Mountain View, CA (US); Robert Li, Fremont, CA (US); Yan Wang, Saratoga, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 68 days.

(21) Appl. No.: 16/410,805

(22) Filed: May 13, 2019

(65) Prior Publication Data

US 2020/0366622 A1 Nov. 19, 2020

(51) Int. Cl.
*H04L 12/863* (2013.01)
*H04L 12/873* (2013.01)

(52) U.S. Cl.
CPC ........ *H04L 47/6295* (2013.01); *H04L 47/521* (2013.01)

(58) Field of Classification Search
None
See application file for complete search history.

(56) References Cited

U.S. PATENT DOCUMENTS 8,199,764 B2 * 6/2012 Hoffman ................. H04L 49/30
370/412

* cited by examiner

*Primary Examiner* — James P Duffy
(74) *Attorney, Agent, or Firm* — Compass IP Law PC

(57) ABSTRACT

In a method for allocating physical queues of a network forwarding element, a request is received at the network forwarding element, the network forwarding element including a plurality of physical queues, where each physical queue of the plurality of physical queues has a fixed bandwidth, the request identifying an allocation of a plurality of virtual queues at the network forwarding element. Based at least in part on the request, a configuration of the plurality of physical queues to the plurality of virtual queues is determined. The plurality of physical queues is configured according to the configuration, wherein the configuring includes allocating at least two physical queues to a virtual queue.

20 Claims, 8 Drawing Sheets

ALLOCATION OF VIRTUAL QUEUES OF A NETWORK FORWARDING ELEMENT

BACKGROUND

Network forwarding elements (e.g., network switches) are devices that receive and forward data packets over computer networks within the data plane. Network forwarding elements include multiple ingress and egress ports that service multiple queues (also referred to as pipelines) for moving the data packets between multiple sources and destinations. Conventional network forwarding elements include a fixed number of queues, with each queue having a fixed transmission rate.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1A:
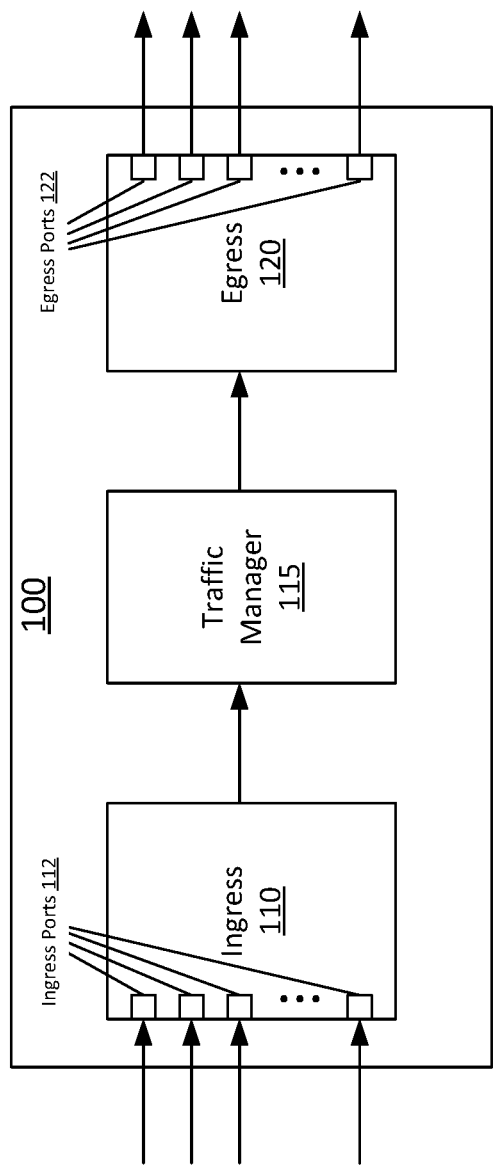
FIG. 1A illustrates a block diagram of hardware forwarding element, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "determining," "configuring," "mapping," "forwarding," "enqueuing," "dequeuing," "designating," or the like, refer to the actions and processes of an electronic device such as computing device or a programmable packet engine.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example network tester and/or programmable packet engine described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, host processor(s) or core(s) thereof, programmable packet engines, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a programmable packet engine and a microprocessor, a plurality of microprocessors, one or more microprocessors in conjunction with a programmable packet engine, or any other such configuration.

Overview of Discussion

Network packet traffic often has different transmission rate and latency requirements based on the type of traffic. For example, data providing time-sensitive information (e.g., voice or live video) requires less latency than other types of traffic (e.g., remote data backup). Other factors may contribute to constraints on bandwidth and latencies (e.g., geographic location, etc.) The bandwidth must be sufficient to ensure little or no latency (e.g., due to a bottleneck in capacity). Conventional fixed function network forwarding element address this issue by including queues of different fixed bandwidths (e.g., two high-speed queues and sixteen low-speed queues).

Embodiments described herein provide devices and methods for allocating physical queues of a network forwarding element to virtual queues. In one embodiment, a request identifying an allocation of a plurality of virtual queues at the network forwarding element is received at the network forwarding element. The network forwarding element includes a plurality of physical queues, where each physical queue of the plurality of physical queues has a fixed bandwidth. Based at least in part on the request, a configuration of the plurality of physical queues to the plurality of virtual queues is determined. The plurality of physical queues is configured according to the configuration, wherein the configuring includes allocating at least two physical queues to a virtual queue.

Other embodiments described herein provide devices and methods for scheduling packets at a network forwarding element. Packets are received at a port of the network forwarding element, the port including a plurality of physical queues allocated to a plurality of virtual queues, wherein each physical queue of the plurality of physical queues has a fixed bandwidth, and wherein a virtual queue comprises at least one physical queue. The packets are forwarded to respective virtual queues of the plurality of virtual queues according to packet headers of the packets. The packets are enqueued within the respective virtual queues to allocated physical queues of the respective virtual queues.

Conventional network forwarding elements include a fixed number of queues, with each queue having a fixed transmission rate. For example, conventional network forwarding element typically include a fixed number of high speed queues and a fixed number of low speed queues. The number and transmission rate of each queue is fixed and not subject to any customization or configurability. As the number and transmission rate of the queues is fixed, users (e.g., network administrators) are forced to allocate traffic according to the fixed parameters of the forwarding elements, often resulting in less than optimal traffic allocation (e.g., unused or underutilized queues) or the necessity to acquire additional hardware, at additional expense.

The embodiments described herein provide for the configurability of physical queues of the network forwarding element into virtual queues. A virtual queue includes one or more physical queue, such that the virtual queue operates transparently to a user as a queue of the configured transmission rate. For example, a network forwarding element of the described embodiments includes 128 physical queues, each queue supporting a transmission rate of 50 Gbps. The 128 physical queues can be allocated to virtual queues in any combination. For example, sixteen virtual queues each including eight physical queues can be configured, where each virtual queue supports a transmission rate of 400 Gbps. In another example, two virtual queues each including eight physical queues, eight virtual queues including four physical queues, and eight virtual queues including one physical queue can be allocated, providing two 400 Gbps queues, eight 200 Gbps queues, and eight 50 Gbps queues. It should be appreciated that the allocation of the physical queues to virtual queues is fully flexible across all available physical queues, and that any combination of allocated physical queues can be implemented.

Forwarding Element Including Configurable Queues

Embodiments described herein provide a hardware forwarding element with novel configurability of queues by allocating physical queues of the forwarding element to virtual queues. A virtual queue provides the packet transmission rate of the sum of the transmission rates of the physical queues of the virtual queue. The hardware forwarding element of the described embodiments includes a plurality of physical queues, also referred to herein as physical pipelines, that can be allocated to one or more virtual queues, also referred to herein as virtual pipelines.

Turning now to the figures, FIG. 1A conceptually illustrates a block diagram of hardware forwarding element 100 in accordance with some embodiments. As shown, forwarding element 100 includes ingress queue 110, traffic manager 115, and egress queue 120. It should be appreciated that hardware forwarding element 100 includes a plurality of ingress queues 110 and egress queues 120, as described in accordance with FIG. 2.

As illustrated, ingress packets are received at ingress queue 110 through a set of ingress ports 112. The ingress packets are forwarded to traffic manager 115, which then forwards egress packets to the appropriate egress ports 122 of egress queue 120. In some embodiments, traffic manager 115 is configured to allocate an egress queue 120 to a virtual queue, such that the egress queues 120 of a virtual queue operate collectively as a single queue.

Figure 1B:
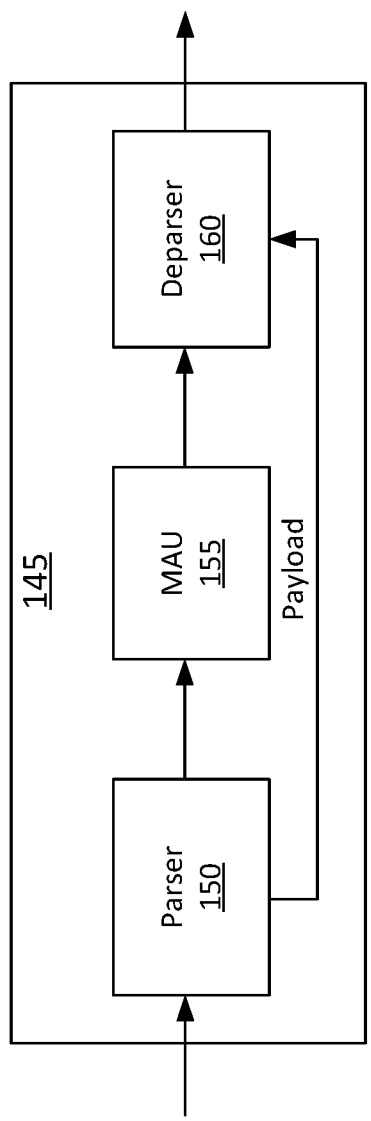
FIG. 1B illustrates a block diagram of an interface of the hardware forwarding element, according to some embodiments.

FIG. 1B illustrates a block diagram of an interface 145 of the hardware forwarding element 100. Each one of the ingress queues 110 and egress queues 120 uses an interface similar to interface 145. Interface 145 includes a queue including different units, e.g., parser unit 150, MAU 155, and a deparser unit 160. Parser 150 of some embodiments receives the incoming packets and produces a packet header vector (PHV) as its output. In other words, parser 150 separates the packet headers from the packet payload by extracting different fields of packet headers and storing them in the PHV. In some embodiments the PHV includes a set of different size registers or containers. In some embodiments, parser 150 stores each extracted packet header in a particular subset of one or more registers of the PHV.

Traffic manager 115 has a centralized view of each interface 145 of the ingress queues 110 and egress queues 120, and directs the packet traffic to the appropriate egress queue 120. Embodiments described herein provide for the allocation of physical queues (e.g., egress queues 120) to virtual queues, where the virtual queues operate as a single queue for packet forwarding. In other words, virtual queues are mapped to any number of physical queues and operate as single queues for purposes of receiving and forwarding traffic. For example, enqueue and dequeue operations can be performed in a rotation manner among the physical queues mapped to a virtual queue. In some embodiments, each physical queue maintains its link list in an empty state and the schedule side maintains a per virtual queue counter to track the number of physical queue empty states. Therefore, multiple dequeue decisions can be made in-flight before the empty state propagates back to the virtual queue.

The PHV provides the input data to the match tables of MAU 155. In some embodiments, MAU 155 includes a set of match-action stages (e.g., 32 match-action stages). Each of these stages matches a particular set of header fields against a match table and takes an action based on the result of the match (e.g., assigning the packet to an output port and queue, dropping the packet, modifying one or more of the header fields, etc.). Based on the actions taken on different header data during the different stages of MAU 155, the PHV output by MAU 155 might include the same header data as the PHV that MAU 155 received from parser 150, or the output PHV might contain different data than the input PHV.

The output PHV is then handed to deparser 160. Deparser 160 reassembles the packet by putting back together the output PHV (that might or might not have been modified) that deparser 160 receives from MAU 155 and the payload of the packet that deparser 160 receives directly from parser 150.

Deparser 160 then sends the packets out of the ingress/egress queue (to traffic manager 115 or out of forwarding element 100, depending on whether it is deparser 160 for the ingress queue or the egress queue). An output packet may be the same packet as the corresponding input packet (i.e., with identical packet headers), or it may have different packet headers compared to the input packet based on the actions that are applied to the packet headers in the ingress and egress queues (e.g., different header field values for certain header fields and/or different sets of header fields).

It should be understood that the illustrated blocks in forwarding element 100 are examples. The ingress 110, traffic manager 115, and egress 120 blocks are simplified for ease of description. For example, although FIG. 1B shows only one entry point to the ingress parser 150 and one exit point from the egress deparser 160, in some embodiments the input signals are received by many different input channels (e.g., 64 channels) and the output signals are sent out of the forwarding element from different output channels (e.g., 64 channels). Additionally, although for the illustrated forwarding element only one parser interface is shown for the interface 145, some embodiments employ numerous parser blocks (e.g., 16 parser blocks) that feed a match-action unit (MAU) in each queue.

Figure 2:
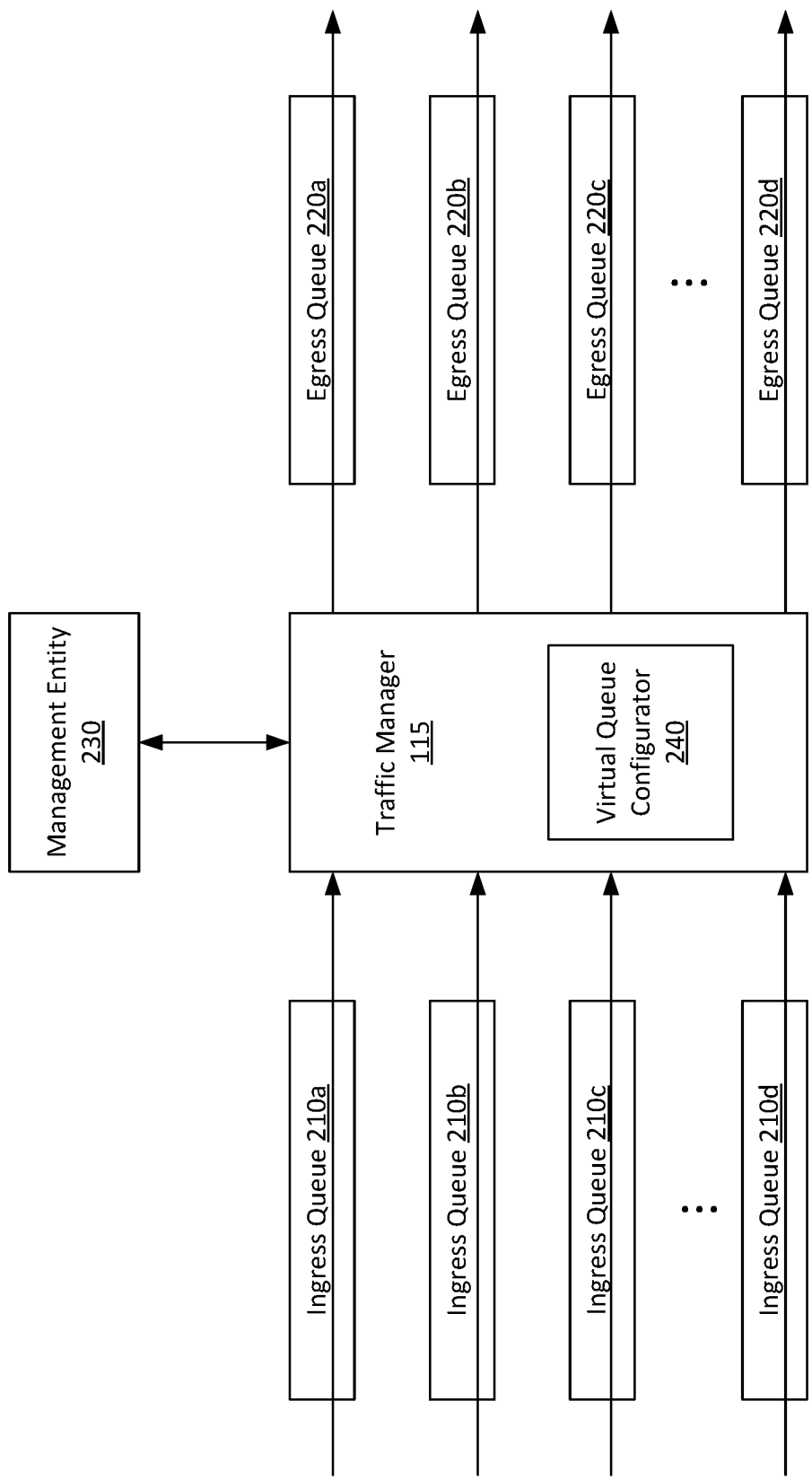
FIG. 2 illustrates details of a hardware forwarding element that includes several ingress and egress queues, according to some embodiments.

FIG. 2 conceptually illustrates further details of a hardware forwarding element that includes several ingress and egress queues, in some embodiments. FIG. 2 illustrates traffic manager 115, several ingress queues 210a-210d (each queue is similar to ingress queue 110 in FIG. 1A) and several egress queues 220a-220d (each queue is similar to egress queue 120 in FIG. 1A). FIG. 2 also illustrates a management entity 230 for managing and monitoring operation and configuration of forwarding element 100 and its components (e.g., traffic manager 115). For example, management entity 230 may be a remote computer system utilized by a network administrator for configuring virtual queues. As shown, traffic manager 115 also includes virtual queue configurator 240.

In some embodiments, hardware forwarding element 100 processes network packets according to a series of match-action tables that specify when to perform certain operations on the packets. The match-action tables include match entries that specify sets of match conditions that can be met by packets, and corresponding action entries that specify operations to perform on packets that meet the match conditions. As an example, a match-action table might match on the destination address of an ingress packet and specify an output port to which to send the packet. Different destination addresses (e.g., different match entries) correspond to output actions to different ports (e.g., different action entries) of the forwarding element 100.

According to various embodiments, virtual queue configurator 240 is operable to configure virtual queues by allocating physical queues to virtual queues, and managing traffic according to the virtual queues. In other words, one or more physical queues are bundled by virtual queue configurator 240 into a virtual queue, where the virtual queue handles traffic collectively for the bundled physical queues, effectively providing one queue that provides the sum of the transmission rates for the bundled physical queues.

Figure 3:
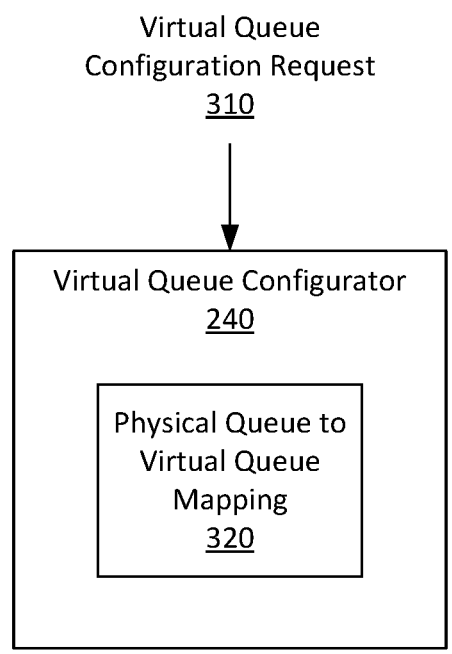
FIG. 3 illustrates details of virtual queue configurator, according to some embodiments.

FIG. 3 conceptually illustrates virtual queue configurator 240, in some embodiments. A virtual queue configuration request 310 is received at virtual queue configurator 240. In one embodiment, request 310 is received from management entity 230 over a communication connection to forwarding element 100. Request 310 identifies an allocation of physical queues to a virtual queue. For example, consider a forwarding element with eight physical queues, each of which provides a transmission rate of 50 Gbps. A request 310 may be received for allocating a virtual queue having a transmission rate of 200 Gbps. Virtual queue configurator 240 allocates four physical queues to a single virtual queue, thus providing a virtual queue having a transmission rate of 200 Gbps.

It should be appreciated that, in some embodiments, the virtual queue configuration can be performed dynamically for changing the virtual queue configuration. For instance, in response to detecting a change in network traffic patterns and/or types, a virtual queue configuration request 310 can be automatically generated (e.g., by management entity 230 or by traffic manager 115). Virtual queue configurator 240 performs physical queue allocation dynamically, e.g., on the fly. In such an embodiment, it may be necessary that the physical queues being dynamically allocated to a virtual queue are empty (e.g., include no packets) at the time of the allocation.

In some embodiments, to effectuate the allocation of physical queues to virtual queues, virtual queue configurator 240 also includes a physical queue to virtual queue mapping 320 that maintains the specific physical queue to virtual queue mappings for use by traffic manager 115 in directing traffic to the appropriate queues. For instance, while the distinction between virtual queue and physical queue may be transparent (e.g., to a user), each virtual queue includes dedicated physical queues for handling traffic directed to a particular virtual queue. Mapping 320 maintains these mappings of physical queue to virtual queue for use in forwarding traffic to the appropriate physical queue.

Figure 4:
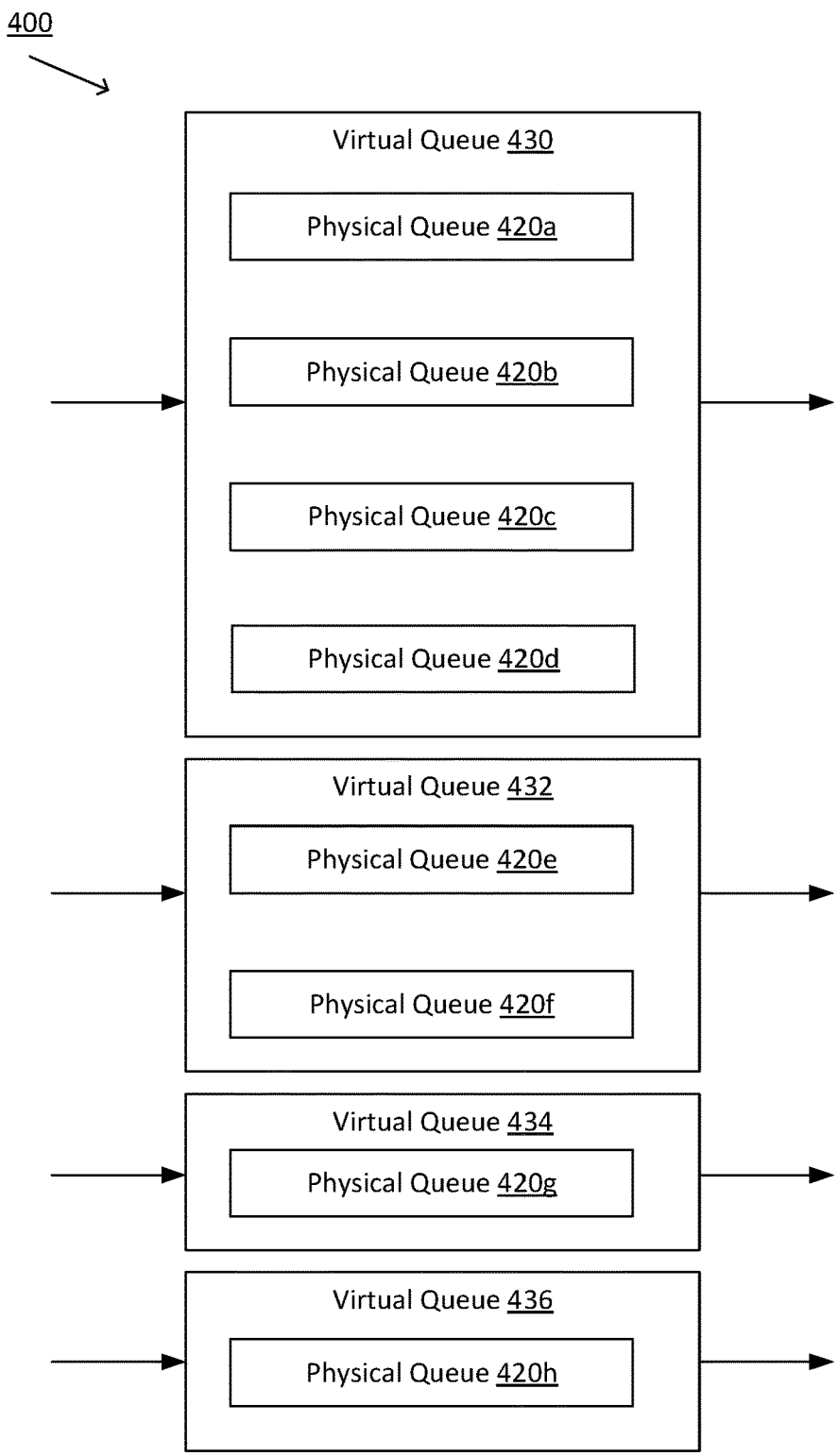
FIG. 4 illustrates an example configuration 400 of virtual queues of a network forwarding element, according to an embodiment.

FIG. 4 illustrates an example configuration 400 of virtual queues of a network forwarding element, according to an embodiment. As illustrated, the network forwarding element includes eight physical queues 420a through 420h. It should be appreciated that the network forwarding element can include any number of physical queues, of which the illustrated embodiment is one example. Moreover, it should be appreciated that any number of the physical queues of a forwarding element can be allocated to virtual queues, e.g., not all physical queues need be allocated. For example, a configuration of virtual queues may only be directed to those virtual queues including more than one physical queue.

Example configuration 400, according to some embodiments, is configured in response to receiving a request for allocation of virtual queues (e.g., request 310). In general, the request includes information necessary to allocate physical queues to virtual queues. For example, the request may identify, without limitation: a number of virtual queues to allocate, a bandwidth of one or more virtual queues to allocate, or a complete configuration including the number of virtual queues and bandwidth of each virtual queue to be allocated. It should be appreciated that the traffic manager (e.g., at virtual queue configurator 240) is capable of allocating physical queues to virtual queues according to the information contained within the request.

As illustrated in example configuration 400, eight physical queues 420a through 420h are allocated to four virtual queues 430, 432, 434, and 436. In one embodiment, each physical queue 420a through 420h has the same transmission rate. As such, in this embodiment, virtual queue 430 provides a transmission rate four times that of its constituent physical queues (e.g., is a high speed queue), virtual queue 432 provides a transmission rate two times that of its constituent physical queues (e.g., is a medium speed queue), and virtual queues 434 and 436 provide transmission rates equal to those the constituent physical queues (e.g., is a low speed queue). It should be appreciated that the physical queues may not all provide the same transmission rate. As such, allocations of physical queues to virtual queues may provide different transmission rates, depending on the transmission rates of the constituent physical queues.

Virtual queue 430 conceptually operates as a single queue, while utilizing its constituent physical queues 420a through 420d in forwarding packets through the forwarding element. Similarly, virtual queue 432 conceptually operates as a single queue, utilizing its constituent physical queues 420e and 420f in forwarding packets through the forwarding element. Virtual queues 434 and 436, only comprising a single physical queue 420g and 420h, respectively, operate as a single physical queue.

Figure 5:
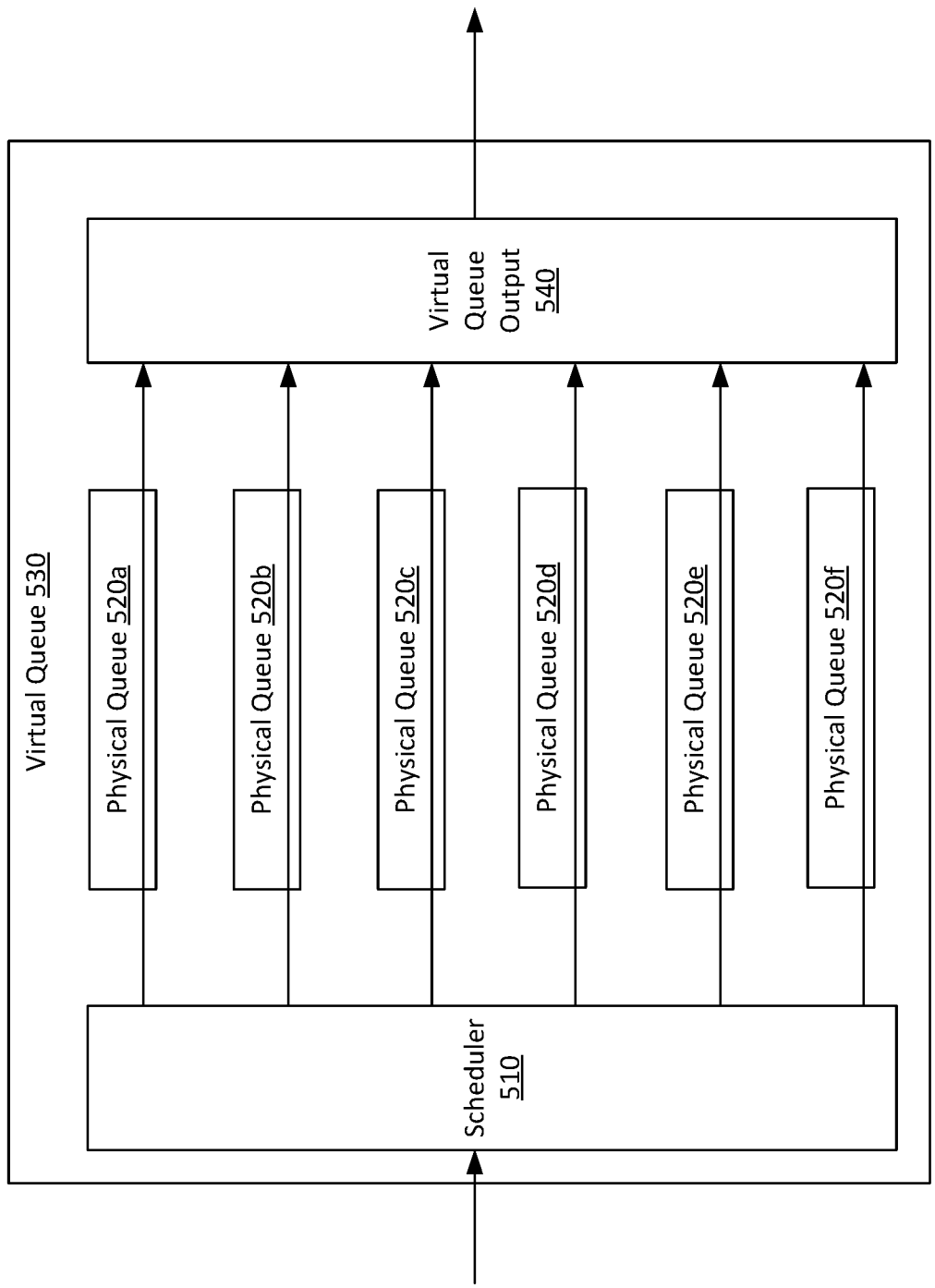
FIG. 5 illustrates details of an example packet transmission within a virtual queue, according to embodiments.

FIG. 5 conceptually illustrates details of an example packet transmission of virtual queue 530, according to embodiments. Virtual queue 530 includes an allocation of six physical queues 520a through 520f. Packet traffic for virtual queue 530 is received at scheduler 510. It should be appreciated that the networking forwarding element includes more than six physical queues 520a through 520f which are, for example, allocated to other virtual queues or remain unallocated. Scheduler 510 may be distributed across all virtual queues and physical queues of the network forwarding device, of which the illustrated scheduler 510 is a component of the distributed scheduler.

Packets received at a network forwarding element follow a transmission order, and a queuing system, e.g., scheduler 510 tracks and orders packet transmission. For example, scheduler 510 may operate in a round robin fashion, directing packets to physical queues 520a through 520f in order, looping back to physical queue 520a. In general, packets are scheduled according to the clock of the network forwarding device, where each virtual queue receives a proportional clock contribution based on the allocation of its constituent physical queues. Virtual queue output 540 operates to output the packets received from each physical queue 520a through 520f.

Example Methods of Operation

Figure 6:
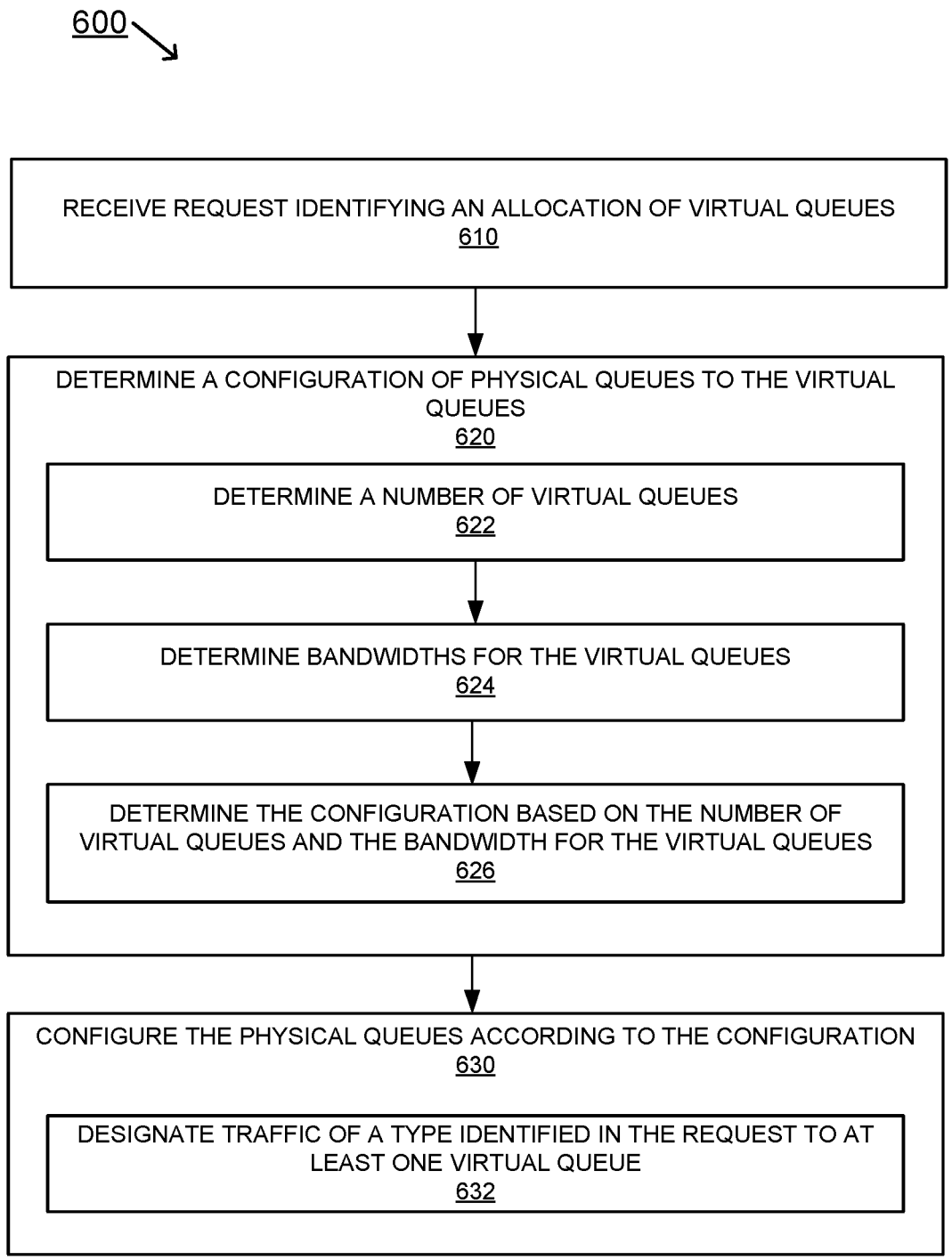
FIG. 6 illustrates a flow diagram of an example method for allocating physical queues of a network forwarding element, in accordance with various embodiments.

FIG. 6 shows a flow diagram 600 of an example method for allocating physical queues of a network forwarding element, in accordance with various embodiments. Procedures of this method will be described with reference to elements and/or components of FIGS. 1A-5. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, or a combination of hardware with firmware and/or software.

At procedure 610 of flow diagram 600, a request (e.g., request 310) is received at a network forwarding element (e.g., forwarding element 100), where the network forwarding element includes a plurality of physical queues (e.g., physical queues 420a through 420g). Each physical queue has a fixed bandwidth. The request identifies an allocation of a plurality of virtual queues at the network forwarding element. In one embodiment, the request identifies a number of virtual queues within the plurality of virtual queues. In one embodiment, the request identifies a bandwidth of at least one virtual queue of the plurality of virtual queues. In one embodiment, the request identifies at least one type of traffic associated with at least one virtual queue. In one embodiment, the request is dynamically generated for changing the allocation of the plurality of virtual queues.

At procedure 620, a configuration (e.g., configuration 400) of the plurality of physical queues to the plurality of virtual queues is determined based at least in part on the request. In one embodiment, as shown in procedure 622, a number of virtual queues of the plurality of virtual queues is determined based on the request and, as shown in procedure 624, bandwidths for the plurality of virtual queues are determined based on the request. At procedure 626, the configuration is determined based on the number of virtual queues and the bandwidths for the plurality of virtual queues. The configuration includes the number of virtual queues of the plurality of virtual queues and the bandwidths for the plurality of virtual queues. In another embodiment, the request includes the configuration, wherein the configuration includes a number of virtual queues of the plurality of virtual queues and bandwidths for the plurality of virtual queues.

At procedure 630, the plurality of physical queues are configured according to the configuration such that at least two physical queues are allocated to a virtual queue (e.g., virtual queue 430). In one embodiment, the physical queues are mapped to at least one virtual queue, such that the virtual queue has a bandwidth equal to a sum of the fixed bandwidth of the constituent physical queues. In one embodiment, the plurality of physical queues are also configured such that one physical queue is allocated to a second virtual queue. In one embodiment, as shown at procedure 632, traffic of the type of traffic identified by the at least one type of traffic is designated to the at least one virtual queue.

Figure 7:
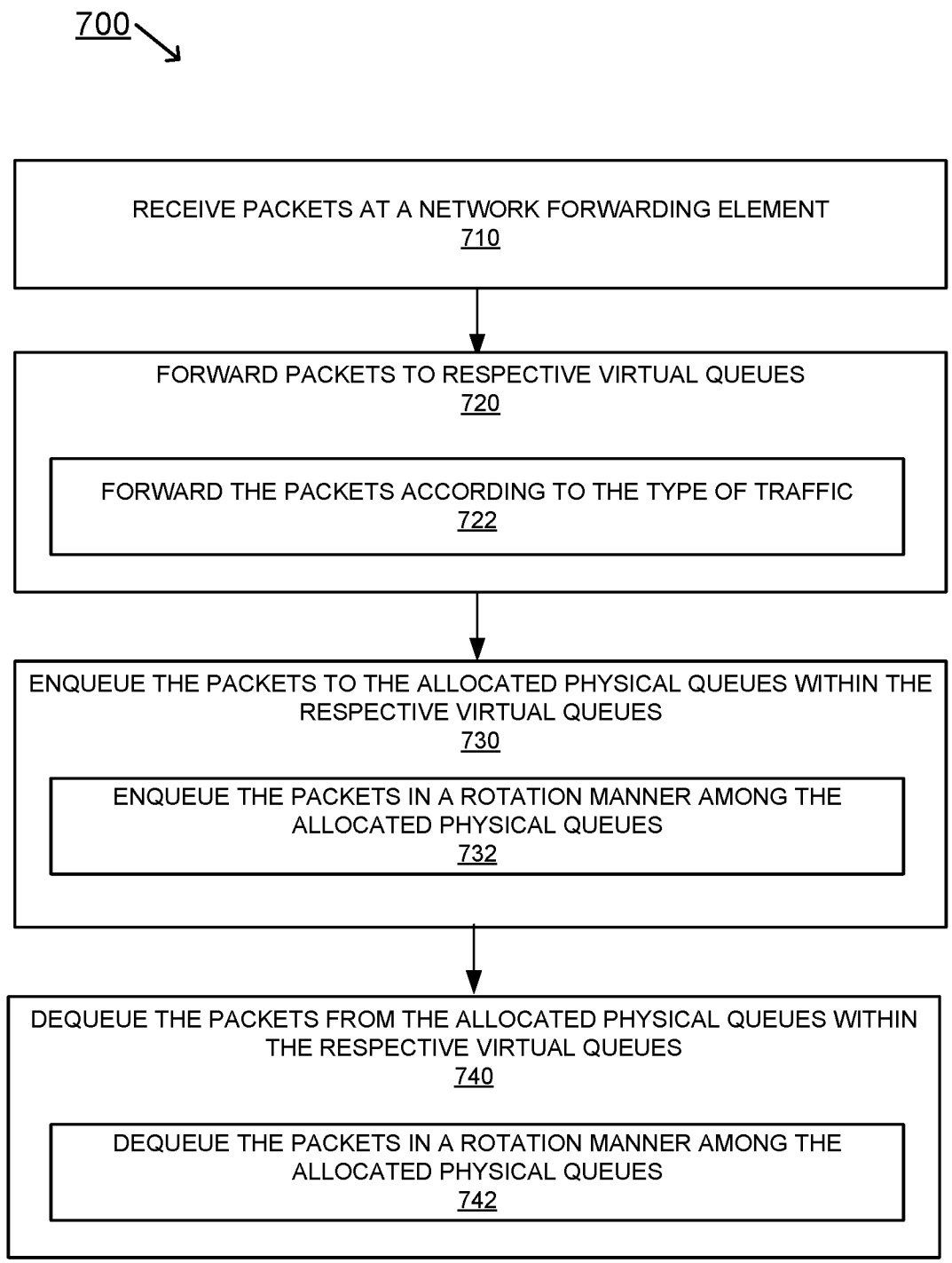
FIG. 7 illustrates a flow diagram of an example method for scheduling packets at a network forwarding element, in accordance with various embodiments.

FIG. 7 shows a flow diagram 700 of an example method for scheduling packets at a network forwarding element, in accordance with various embodiments. Procedures of this method will be described with reference to elements and/or components of FIGS. 1A-5. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors under the control of computer-readable and computer-executable instructions that are stored on non-transitory computer-executable instructions that are stored on non-transitory computer-readable storage media. It is further appreciated that one or more procedures described in flow diagram 700 may be implemented in hardware, or a combination of hardware with firmware and/or software.

At procedure 710 of flow diagram 700, packets are received at a port of the network forwarding element, where the port includes a plurality of physical queues allocated to a plurality of virtual queues. In some embodiments, each physical queue of the plurality of physical queues has a fixed bandwidth, and a virtual queue includes at least one physical queue. In one embodiment, the plurality of physical queues are mapped to the plurality of virtual queues, such that a virtual queue has a bandwidth equal to a sum of the fixed bandwidth of physical queues allocated to the virtual queue. In one embodiment, at least one virtual queue of the plurality of virtual queues is associated with at least one type of traffic.

At procedure 720, the packets are forward to respective virtual queues of the plurality of virtual queues according to packet headers of the packets. In some embodiments, a packet header of a packet identifies a type of traffic. As shown at procedure 722, the packets are forwarded to the respective virtual queues of the plurality of virtual queues according to the type of traffic of the packet header.

At procedure 730, the packets are enqueued within the respective virtual queues to allocated physical queues of the respective virtual queues. In one embodiment, as shown at procedure 732, the packets are enqueued in a rotation manner among the allocated physical queues of the respective virtual queues.

In one embodiment, as shown at procedure 740, the packets are dequeued within the respective virtual queues from the allocated physical queues of the respective virtual queues. In one embodiment, as shown at procedure 742, the packets are dequeued in a rotation manner among the allocated physical queues of the respective virtual queues.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method for allocating physical queues of a network forwarding element, the method comprising:
   receiving a request at the network forwarding element, the network forwarding element comprising a plurality of physical queues, wherein each physical queue of the plurality of physical queues has a fixed bandwidth, wherein the request identifying an allocation of a plurality of virtual queues at the network forwarding element;
   based at least in part on the request, determining a configuration of the plurality of physical queues to the plurality of virtual queues; and
   configuring the plurality of physical queues according to the configuration, wherein the configuring comprises allocating at least two physical queues to a virtual queue.

2. The method of claim 1, wherein the request identifies a number of virtual queues within the plurality of virtual queues.

3. The method of claim 1, wherein the request identifies a bandwidth of at least one virtual queue of the plurality of virtual queues.

4. The method of claim 1, wherein the determining the configuration of the plurality of physical queues to the plurality of virtual queues comprises:
   determining a number of virtual queues of the plurality of virtual queues based on the request;
   determining bandwidths for the plurality of virtual queues based on the request; and
   determining the configuration based on the number of virtual queues and the bandwidths for the plurality of virtual queues, wherein the configuration comprises the number of virtual queues of the plurality of virtual queues and the bandwidths for the plurality of virtual queues.

5. The method of claim 1, wherein the request comprises the configuration, wherein the configuration comprises a number of virtual queues of the plurality of virtual queues and bandwidths for the plurality of virtual queues.

6. The method of claim 1, wherein the configuring the plurality of physical queues according to the configuration comprises:
   mapping the at least two physical queues to the virtual queue, such that the virtual queue has a bandwidth equal to a sum of fixed bandwidths of the at least two physical queues.

7. The method of claim 1, further comprising:
   during a packet scheduling operation:
      receiving a plurality of packets at the network forwarding element;
      forwarding the plurality of packets to respective virtual queues of the plurality of virtual queues;
      enqueuing the packets within the respective virtual queues to allocated physical queues of the respective virtual queues; and
      dequeuing the packets within the respective virtual queues from allocated physical queues of the respective virtual queues.

8. The method of claim 1, wherein the request identifies at least one type of traffic associated with at least one virtual queue.

9. The method of claim 8, wherein the configuring the plurality of physical queues according to the configuration comprises:
   designating traffic of the type of traffic identified by the at least one type of traffic to the at least one virtual queue.

10. The method of claim 1, wherein the configuring the plurality of physical queues according to the configuration further comprises allocating a physical queue to a second virtual queue.

11. The method of claim 1, wherein the request is dynamically generated for changing the allocation of the plurality of virtual queues.

12. A method for scheduling packets at a network forwarding element, the method comprising:
   receiving packets at a port of the network forwarding element, the port comprising a plurality of physical queues allocated to a plurality of virtual queues, wherein each physical queue of the plurality of physical queues has a fixed bandwidth, and wherein a virtual queue comprises at least one physical queue, and wherein the plurality of physical queues are mapped to the plurality of virtual queues such that a virtual queue has a bandwidth equal to a sum of fixed bandwidths of physical queues allocated to the virtual queue;
   forwarding the packets to respective virtual queues of the plurality of virtual queues according to packet headers of the packets; and
   enqueuing the packets within the respective virtual queues to allocated physical queues of the respective virtual queues.

13. The method of claim 12, wherein the enqueuing the packets comprises:
   enqueuing the packets in a rotation manner among the allocated physical queues of the respective virtual queues.

14. The method of claim 12, further comprising:
   dequeuing the packets within the respective virtual queues from the allocated physical queues of the respective virtual queues.

15. The method of claim 14, wherein the dequeuing the packets comprises:
   dequeuing the packets in a rotation manner among the allocated physical queues of the respective virtual queues.

16. The method of claim 12, wherein each virtual queue of the plurality of virtual queues is associated with at least one type of traffic, wherein a packet header identifies a type of traffic, and wherein the forwarding the packets to respective virtual queues of the plurality of virtual queues according to the packet headers of the packets comprises:

forwarding the packets to the respective virtual queues of the plurality of virtual queues according to the type of traffic of the packet header.

17. A hardware network forwarding element comprising:
at least one port comprising a plurality of physical queues, wherein each physical queue of the plurality of physical queues has a fixed bandwidth, wherein the at least one port is configured to:
receive a request identifying an allocation of a plurality of virtual queues at the network forwarding element;
based at least in part on the request, determine a configuration of the plurality of physical queues to the plurality of virtual queues, wherein the configuration comprises a number of virtual queues of the plurality of virtual queues and bandwidths for the plurality of virtual queues; and
configure the plurality of physical queues according to the configuration, wherein the configuring comprises allocating at least two physical queues to a virtual queue.

18. The network forwarding element of claim 17, wherein the at least one port is configured to:
map the at least two physical queues to the virtual queue, such that the virtual queue has a bandwidth equal to a sum of fixed bandwidths of the at least two physical queues.

19. The network forwarding element of claim 17, wherein the request identifies at least one type of traffic associated with at least one virtual queue, wherein the at least one port is configured to:
designate traffic of the type of traffic identified by the at least one type of traffic to the at least one virtual queue.

20. The network forwarding element of claim 17, wherein the at least one port is configured to:
receive packets at the at least one port;
forward the packets to respective virtual queues of the plurality of virtual queues according to packet headers of the packets;
enqueuing the packets within the respective virtual queues in a rotation manner to allocated physical queues of the respective virtual queues; and
dequeuing the packets within the respective virtual queues in the rotation manner from the allocated physical queues of the respective virtual queues.

\* \* \* \* \*